Sept. 16, 1958 T. F. CARMICHAEL 2,852,647
RHEOSTAT
Filed May 10, 1956 3 Sheets-Sheet 1
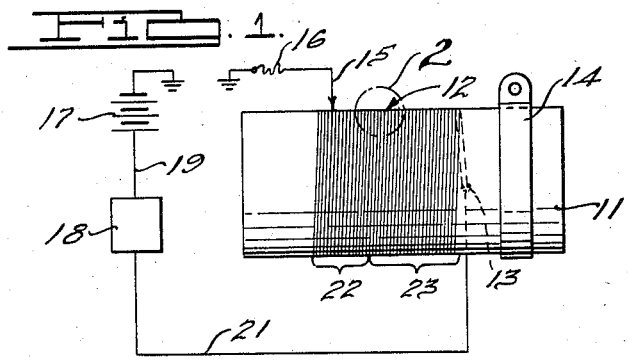
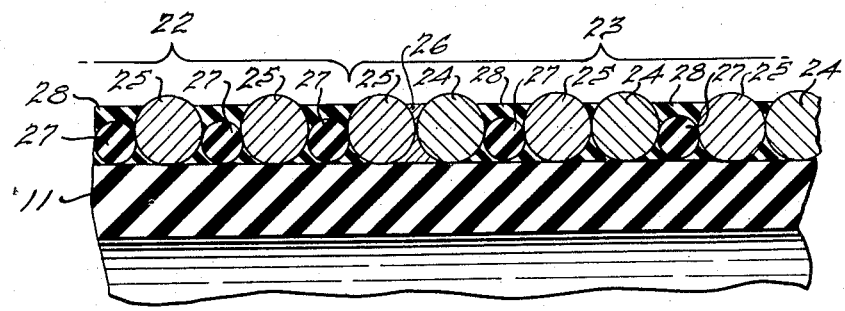
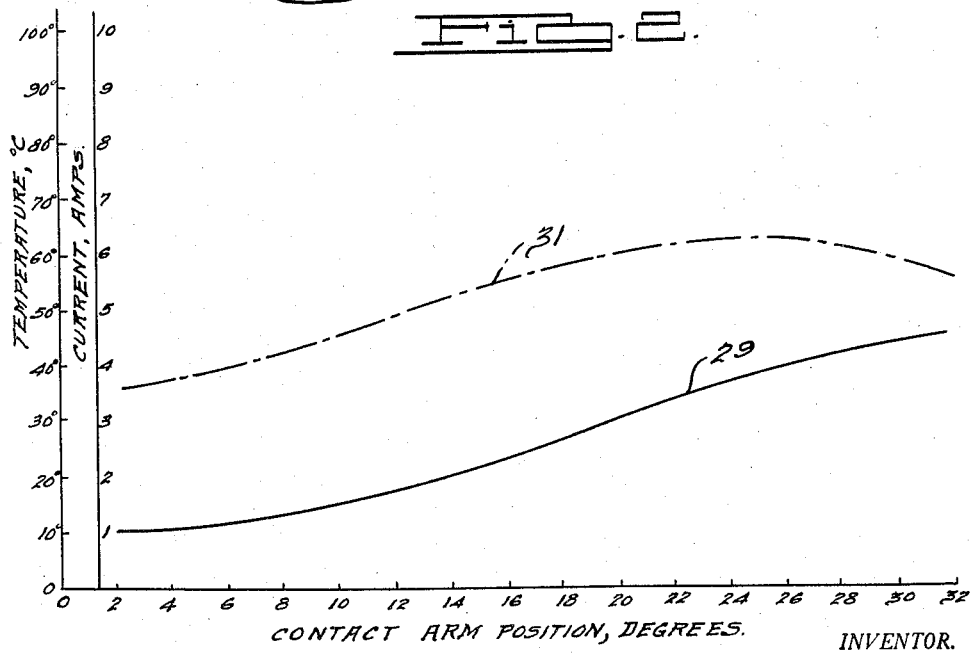
INVENTOR.
Thomas F. Carmichael.
BY
Harness, Dickey & Pierce
ATTORNEYS.

Sept. 16, 1958     T. F. CARMICHAEL     2,852,647
RHEOSTAT
Filed May 10, 1956     3 Sheets-Sheet 2
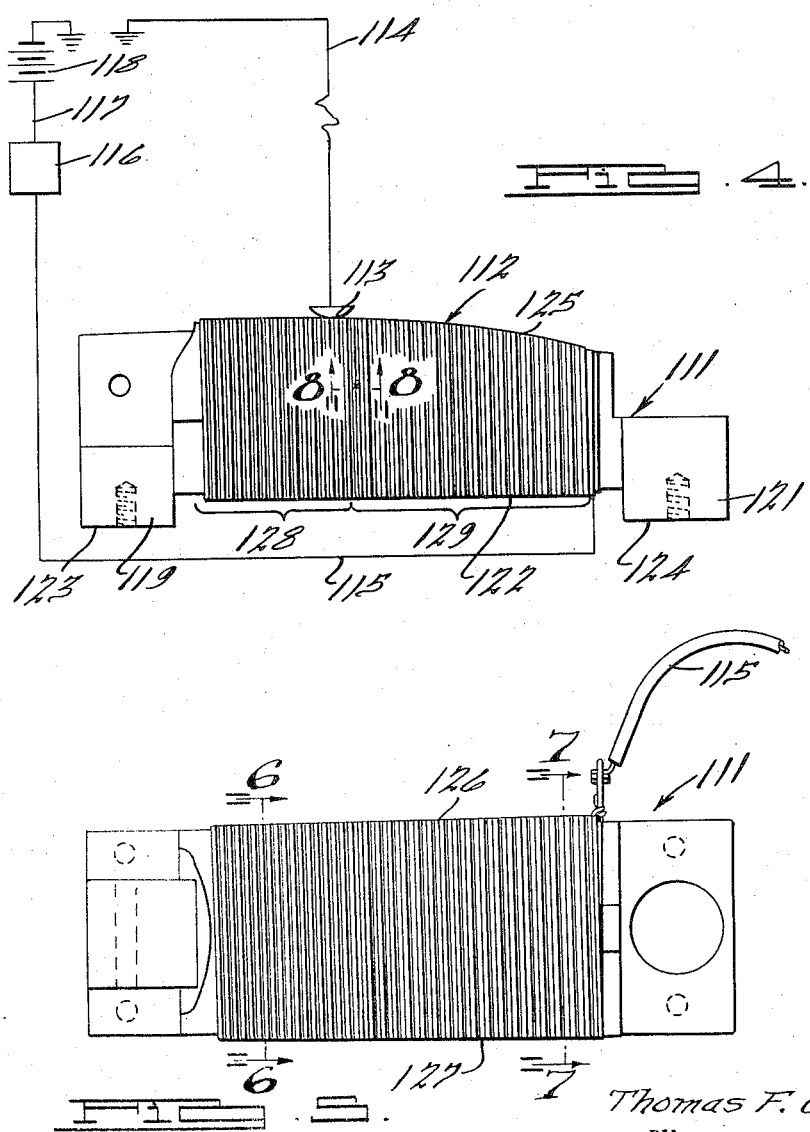
INVENTOR.
Thomas F. Carmichael
BY
Harness, Dickey & Pierce
ATTORNEYS Sept. 16, 1958     T. F. CARMICHAEL     2,852,647
RHEOSTAT
Filed May 10, 1956     3 Sheets-Sheet 3
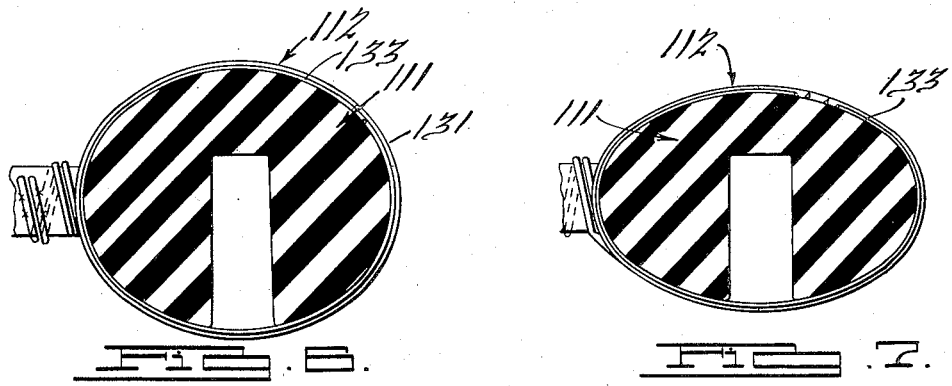
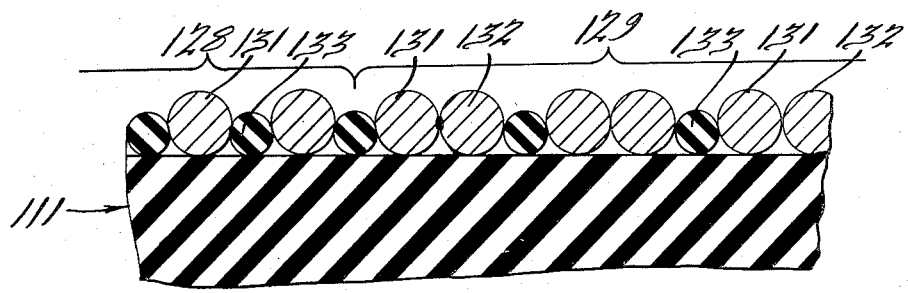
INVENTOR.
Thomas F. Carmichael
BY
Harness, Dickey & Pierce
ATTORNEYS

United States Patent Office 2,852,647
Patented Sept. 16, 1958

2,852,647

RHEOSTAT

Thomas F. Carmichael, Plymouth, Mich., assignor to Syncro Corporation, Oxford, Mich., a corporation of Michigan Application May 10, 1956, Serial No. 584,141

2 Claims. (Cl. 201—60)

This invention relates to rheostats, and more particularly to variable resistors adapted for use in conjunction with devices such as electric vehicle brakes, in which a reliable and uniform current adjustment is required. This application is a continuation-in-part of application Serial No. 359,729 filed June 5, 1953, now abandoned, by the present applicant.

The growing use of electric brakes in automotive vehicle installations, for example brakes which control trailers towed by the vehicle, has given rise to the need for manually controlled rheostats having special characteristics suitable for such installations. In the conventional electric brake arrangement for auto trailers, the application of braking force is made proportional to the amount of current flowing through the braking circuit, this current being controlled by a manual rheostat operated by the driver. Due to the confined space in which the rheostat is located in the vehicle, it is necessary that the coils of wire have a relatively high specific resistance so that the pitch of the wire turns and the travel of the rheostat arm be within the required dimensions. It is also essential that the rheostat produce a uniform current gradient during movement of the rheostat arm so that the braking force can be uniformly controlled. Another requirement of rheostats in such installations is that excessive temperature be avoided when the current is at a maximum rate, that is, when the contact is at the last few turns of wire. The purpose of avoiding such excessive temperature is to prevent oxidization of the wire and possible danger of fire in the vehicle or failure of the braking system, as well as to prevent variation in current flow due to changed resistance of the wire which might adversely affect the braking.

Various types of constructions have been proposed in the past to meet the problems outlined above. In one known type of rheostat, a single strand of wire is used for the rheostat coil, this wire being composed of a plurality of strands of different diameters soldered or brazed together. Such constructions are of questionable mechanical and electrical strength and have the further disadvantage of producing a non-uniform current change at the soldered connections. Another known construction utilizes a variable pitch for the wire coils in order to achieve a uniform braking current gradient during movement of the contact arm. Such a construction is disadvantageous since it presents the possibility of spaces between the coils so that the contact will not always be in proper engagement with the wire, and also because it does not meet the problem of high temperature in the last few wire turns.

It is an object of the present invention to provide an improved rheostat construction having the special characteristics outlined above and which can be constructed using a conventional cylindrical wire supporting member and the usual sliding contact and associated parts.

It is another object to provide an improved rheostat construction which affords a substantial current change during movement of the contact slide but in which the current gradient is relatively uniform, and in which there is no danger of excessive wire temperature and subsequent current drop when the contact is at the last few turns of wire.

It is another object to provide an improved rheostat of the above nature, which can be constructed using wire of a single gauge and material and which requires a minimum of fabricating operations.

It is also an object, in one form of the invention, to provide an improved rheostat of this nature which combines the basic features of the invention with other characteristics and elements to achieve a sliding contact rheostat construction which will maintain its effectiveness even when relatively high applied voltages are being used.

Other objects, features, and advantages of the present invention will become apparent from the subsequent description, taken in conjunction with the accompanying drawings.

In the drawings:

Figure 1 is a circuit diagram showing a typical use of the improved rheostat of this invention, and also showing the general construction of the rheostat;

Figure 2 is an enlarged fragmentary cross-sectional view taken in the area marked 2 in Figure 1 and showing the turns of single wire as well as the turns of doubly wound wire;

Figure 3 is a chart showing typical measurements of the temperature and current in a rheostat constructed according to the invention;

Figure 4 is an elevational view of a modified form of the improved rheostat having a tapered configuration, the rheostat being shown in conjunction with a circuit to be controlled;

Figure 5 is a top plan view of the rheostat of Figure 4 showing the shape of the sides;

Figure 6 is an end cross-sectional view taken along the line 6—6 of Figure 5 and showing the elliptical cross-sectional shape of the larger end of the core;

Figure 7 is a cross-sectional view taken along the line 7—7 of Figure 5 and showing the relative size of the smaller end of the rheostat; and Figure 8 is an enlarged fragmentary cross-sectional view taken along the line 8—8 of Figure 4 and showing the juncture between the first and second conductors.

Referring first to the embodiment of Figures 1 and 2, the invention incorporates the general principles of construction of a tubular sliding-contact rheostat, and comprises a tube or bushing 11 which acts as the support for the resistive conductor, tube 11 being fabricated of porcelain, pottery or other insulating material. The resistive conductor is generally indicated at 12 and is wound around the support 11 in helical fashion, one end of the conductor leading to a terminal 13 for connection in the circuit. A bracket 14 may be provided on the tubular support for securing the rheostat to a supporting member, and a sliding contact schematically shown at 15 engages the conductor 12 and is axially movable by means (not shown) such as a pivoted lever along the tubular support. The contact 15 is connected by a conductor 16 to battery 17 or other source of electrical power, for example through ground, and a device 18 to be controlled is connected in circuit with the battery and rheostat by conductors 19 and 21 respectively.

The invention consists in the construction and arrangement of resistive conductor 12 on the tubular support, and this arrangement is best seen in Figures 1 and 2. The winding 12 is made up of two sections, a first section 22 which comprises a plurality of turns of single wire, and a second section 23 which comprises a plurality of turns of double wire. In a suitable construction, the rheostat is made by securing, by soldering, brazing or other means, a second strand of wire 24 to a strand 25 which is wound the entire distance, the gauge and material of both wires being identical if desired. Strand 24 is attached to strand 25 part way along its length, and the double strand of wire constitutes the section 23 of the winding. As seen in Figure 2, the wire strands 25 and 24 are secured together at 26, and the other end of the double strand of wire is connected to terminal 13. In both sections 22 and 23 of the rheostat winding, adjacent turns are insulated from each other by an insulating strand 27 which may for example be fiberglass cord. The adjacent strands 24 and 25 in section 23 of the winding are shown as being in contacting relation, although it will be understood that in the broader sense of the invention the wires need not be limited to this arrangement or to a soldered or brazed connection, as long as both strands are always in circuit with sliding contact 15. To this end, for example, contact 15 may be of such width as to simultaneously engage both strands 24 and 25 when in section 23 of the winding. An embedding material 28 is preferably applied to the winding turns. This material may be of any known type but, for the reasons seen below, an inexpensive type of insulating substance could be utilized for the embedding material. Of course, the portions of the windings in the vicinity of sliding contact 15 are exposed so that proper electrical conduction may take place.

The material from which the wires of windings 22 and 23 are fabricated is not critical, although wire of suitable resistance and current-carrying ability, in terms of its temperature coefficient of resistance, should be chosen. Wire having a substantial specific resistance will ordinarily be preferred in applications such as electric brake circuits where a substantial resistance change must take place within a relatively short contact arm travel. The wire material and wire size should be such that there are no abnormal temperature conditions either when the sliding contact 15 is engaging a portion of the single strand section or when it is engaging the double strand section. It will therefore be seen that the relative sizes of single turn section 22 and double turn section 23 must also be such that, as described below, there is a negligible change in wire temperature throughout the contact movement which will not affect the uniformity of current gradient.

It will be seen from the above description that when contact 15 is at the left side of the winding 12 as seen in Figure 1, the current will pass both through the single strand section 22 and the double strand section 23. The current at this time will be relatively low, but will increase as the contact moves to the right. Normally, this current increase would result in a substantially higher temperature in the portion of the winding still in the circuit, thus changing the resistance characteristics of the winding and destroying the uniformity of current change. With the present invention, as the contact 15 moves to the right it eventually passes connecting point 26 and thereafter the current will flow only in double strand section 23. Since the cross-section of current-carrying wire is now twice that of a single strand of wire, the current in each strand is not sufficient to cause a marked increase in its temperature. The resistive characteristics of section 23 of the winding therefore remains substantially uniform, and there will continue to be a smooth current gradient as the contact continues its rightward movement.

It will be seen from the foregoing that a rheostat construction has been achieved in which a substantial current change is available in a limited space, this current gradient being uniform during the sliding contact movement, and that excess temperature is avoided in the last few turns of wire which might hamper the effectiveness of the device. The rheostat is constructed using conventional parts such as the supporting core and wire, and is of a conventional shape requiring no special arrangement of the slide actuator. Furthermore, the rheostat is of relative inexpensive construction, not only because of the conventional parts used, but because little or no brazing or soldering is required, and the same type of wire may be used for both strands of the double strand section 23.

Figure 3 shows the performance results of a typical rheostat constructed according to the invention, the wire used in this case being "Chromel" resistance wire made by the Hoskins Manufacturing Co. The chart shows both the current change and tempertaure change in the current-carrying portion of the winding during movement of the contact arm, the latter being expressed along the abscissa as degrees of movement of a pivoted actuating lever for the sliding contact. The current curve 29 shows the uniformity of current gradient throughout the contact travel, and it should be noted that no perceptible transition was observed when the contact moved past the junction between sections 22 and 23. The temperature curve 31 indicates a relatively slight variation in wire temperature, and in fact a temperature decrease is shown for the last few turns of wire, even though the current was highest at this point. The drop may possibly be explained by the location of the last few turns of wire at a point on the support which permits more heat dissipation by radiation, convection or conduction.

The modified form of the invention shown in Figures 4 to 8 differs from the first embodiment primarily in that the rheostat body is of tapered construction, thus providing shorter lengths per turn at the high-current than at the low-current end of contact travel. The rheostat comprises a body or core generally indicated at 111 of ceramic or other insulative material carrying a winding generally indicated at 112. The winding is adapted for engagement by a sliding contact 113, connected by a conductor 114 to ground. One end of winding 112 is connectable by a conductor 115 to a load 116 such as the electromagnet coil of an automotive electric brake, the opposite side of the load being connected by a conductor 117 to a battery 118 or other source of electrical power.

The body 111 of the rheostat has a pair of feet 119 and 121 for mounting purposes, and is of generally elliptical cross-sectional shape between these feet. As indicated in Figures 6 and 7 the cross-sectional area of the rheostat body varies from one end to the other, being larger adjacent foot 119 and smaller adjacent foot 121. This variation in cross-sectional area is achieved in the present embodiment by maintaining the lower surface of the body, indicated at 122 in Figure 4, substantially parallel to the common plane defined by the bottom surfaces 123 and 124 of feet 119 and 121 respectively, while progressively reducing the distance between the upper surface 125 of the body and the lower surface 122 in the direction running from foot 119 to foot 121. The opposite side surface portions 126 and 127 of the rheostat are maintained in substantially parallel relation as indicated in Figure 5. With this construction, it will be seen that the length of a turn of wire taken at that portion of the rheostat body adjacent foot 119 will be substantially greater than the length of a turn taken adjacent foot 121, and that the lengths of such turns will be progressively less in the direction running from foot 119 to foot 121.

The winding 112 on the rheostat body comprises two sections 128 and 129. A strand of wire 131, indicated in Figure 8, is wound on the body throughout the extent of both sections 128 and 129, while a second wire 132 is wound alongside wire 131 throughout the extent of section 129 alone. One end of wire 132 is preferably fastened, by welding or similar means, to wire 131 at the juncture of sections 128 and 129. Ends of both wires 131 and 132 are in adjacent relation at the outer end of section 129 and are connected to conductor 115. Preferably, wires 131 and 132 are of the same gauge and are in electrical contact throughout their common extent, an insulative winding 133 being disposed between adjacent turns of wire 131 in section 128 and between adjacent turns of the parallel wires in section 129.

In operation, closure of the circuit will cause a predetermined voltage to be applied between contact 113 and conductor 115. Assuming an initial condition in which a relatively low current flow through the circuit is desired, contact 113 will be moved along the rheostat until it reaches a position close to foot 119. When in this position, current will flow through most of section 128 and through all of section 129 of the winding, the relatively high combined resistance of these sections permitting only a relatively low current to flow in the circuit. Should a slightly greater current be desired, contact 113 will be moved to the right along section 128 toward the juncture of this section with section 129. The turns of wire 131 passed during this movement will have a relatively long length, and a relatively large resistance per unit length since section 128 has only a single wire strand. The resistance change per unit of contact movement will thus be relatively great, especially in the initial portion of the movement. The wire temperature during this phase of the operation will be relatively low since the current passing through the rheostat is of a low magnitude.

Assuming now that a relatively heavy current is desired in the circuit, contact 113 will be moved to some portion of section 129, say the intermediate portion of this winding section. When in this positon, current will flow only through that portion of section 129 disposed between contact 113 and coductor 115. Since the current is relatively large, the winding temperature will become substantially greater than that obtaining during the low-current phase of operation discussed above. Because of this higher temperature, the resistivity of those portions of wire strands 131 and 132 which are in the circuit will be substantially increased.

Assuming it is desired to increase slightly the current in the circuit, contact 113 will be moved from its intermediate position on section 129 toward foot 121. Due to the increased resistivity of the winding, such movement of the contact might ordinarily produce a greater current change per unit of movement than was produced when the contact was moved along section 128. However, the fact that winding section 129 has two parallel wires 131 and 132 instead of a single strand, means that the resistance per unit length of the parallel wires is substantially less than the resistance per unit length of wire 131 alone. This decreased resistance per unit length will serve to counteract the tendency of the increased resistivity of the wires to produce a greater current change per unit of contact movement. Moreover, because of the tapered nature of the rheostat body the length of each turn of the parallel wires in section 129 is substantially less than the length per turn of wire 131 in section 128. The amount of resistance change for each unit of contact movement in section 129 will thus be further decreased, serving as an additional counteracting factor against the above-described effect of increased wire temperature.

In the illustrated embodiment, the progressive reduction of the distance between upper surface 125 and lower surface 122 of the body is so distributed that winding section 129 has a somewhat greater rate of reduction than section 128. This is accomplished in the manner shown in Figure 4 by providing surface 125 with a slightly convex configuration. This arrangement has been found to produce optimum results, probably because the rate of temperature rise in the winding per unit of contact movement is somewhat greater as contact 113 approaches foot 121 of the rheostat.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims. In particular, it will be seen that the invention could be carried out by having one portion of a rheostat wound with a single strand of wire, an adjacent portion with a double strand, and the next portion with a triple strand. Rheostats could likewise be built with any appropriate succession of multiple strands in the manner indicated.

What is claimed is:

1. In a rheostat for producing a uniform current gradient when subjected to the application of a predetermined voltage, an insulative support, a first conductor having a predetermined number of turns on said support, a second conductor of shorter length than said first conductor and wound on said support adjacent only a portion of the turns of said first conductor whereby said rheostat comprises a first section having only turns of said first conductor and a second section having turns of said first and second conductors in parallel relation, said two conductors being in electrical contacting engagement substantially throughout their common extent and having adjacent ends, an insulating winding disposed between adjacent turns of said first conductor in said first section and between adjacent turns of said parallel conductors in said second section, means for connecting said adjacent ends in a circuit to be controlled, and a contact movable along said support and adapted for connection in said circuit, the ratio between the lengths of said first and second sections being such that distortions in current gradient at the predetermined applied voltage due to changes in conductor temperature will be prevented.

2. In a sliding contact rheostat construction for producing a uniform current gradient upon the application of a predetermined voltage, an insulative support having a relatively large cross-sectional area at one end and a relatively small cross-sectional area at the other end, a resistive conductor on said support having two sections, the first section comprising one resistive conductor strand wound on a portion of said support beginning at the end having a larger cross-sectional area, said second section comprising a continuation of said single resistive conductor strand and a second resistive strand wound in parallel with said first strand, said two strands having the same gauge and being in electrical contacting engagement along their common extent, said second strand being fastened to said first strad at the juncture of said two sections, said second section being wound on a portion of said support between said first section and the end of said support having a smaller cross-sectional area, whereby a sliding contact may pass successively along said sections, and an insulating winding disposed between adjacent turns of said sections, the ratio between the lengths of said first and second sections being such that distortions in current gradient at the predetermined applied voltage due to changes in conductor temperature will be prevented.

References Cited in the file of this patent

UNITED STATES PATENTS

| 2,114,330 | Borden | Apr. 19, 1938 |

FOREIGN PATENTS

| 80,354 | Austria | Mar. 26, 1920 |
| 272,126 | Great Britain | June 9, 1927 |